3,029,263
7-METHYL-4,6-ANDROSTADIENES
J Allan Campbell and John C. Babcock, Kalamazoo Township, Kalamazoo County, Mich., assignors to The Upjohn Company, Kalamazoo, Mich., a corporation of Delaware
No Drawing. Filed Dec. 24, 1959, Ser. No. 861,775
3 Claims. (Cl. 260—397.45)

This invention relates to certain novel steroids, more particularly to 11-oxygenated-17α-alkyl-4,6-androstadien-3-ones, the 9α-halo derivatives thereof, 7β,17α-dialkyl-4,6-androstadien-3-ones, to novel processes for the production thereof and to intermediates produced thereby. This application is a continuation-in-part of our abandoned applications Serial Numbers 740,207 (filed June 6, 1958) and 781,856 (filed December 22, 1958), the latter being in turn a continuation-in-part of our copending application 740,194 (filed June 6, 1958), now abandoned.

The process and novel compounds of this invention may be represented by the following formulae:

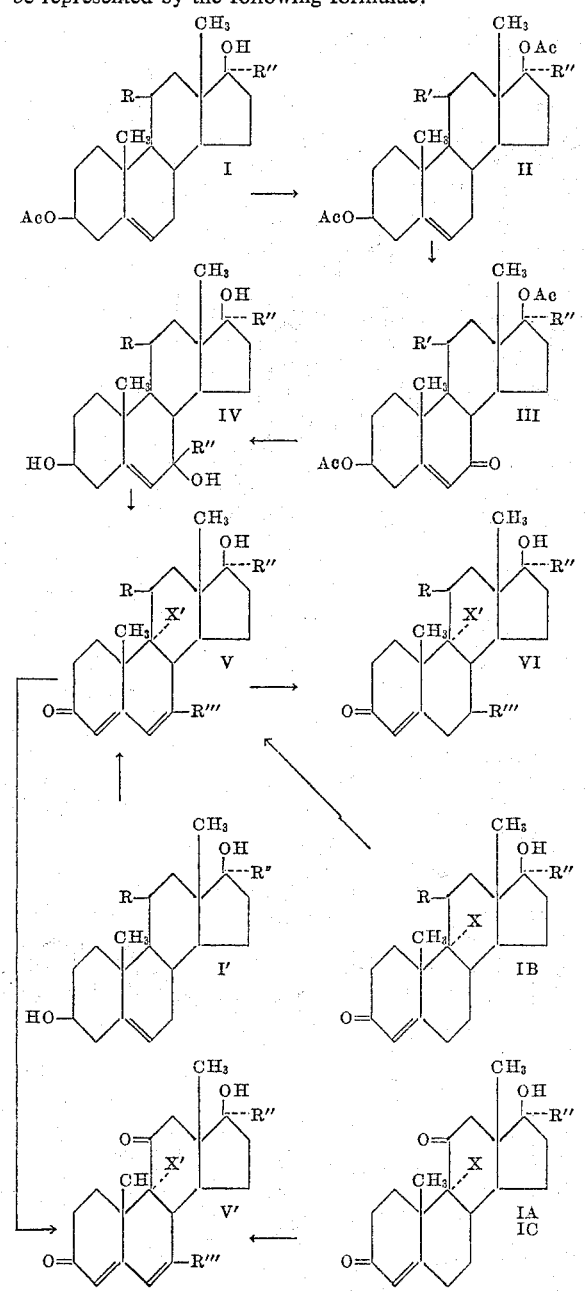

wherein Ac is the acyl radical of an organic carboxylic acid, e.g., a hydrocarbon carboxylic acid containing from 1 to 12 carbon atoms, inclusive; R is hydrogen or β-hydroxy; R' is hydrogen or β-acyloxy, wherein acyl is Ac as defined hereinabove; R" is a lower-alkyl group containing from 1 to 8 carbon atoms, inclusive; R''' is hydrogen or a lower-alkyl group containing from 1 to 8 carbon atoms, inclusive; X is a halogen, e.g., fluorine, bromine or chlorine and X' is hydrogen or halogen.

According to the process of this invention, a 3β,17β-diacyloxy - 17α - methyl - 5 - androsten-7-one represented by Formula III is reacted with a methyl Grignard reagent, e.g., methyl magnesium bromide, methyl magnesium iodide, or methyl lithium, to produce a 3β,7,17β-trihydroxy-7,17α-dimethyl-5-androstene (IV). This compound is then oxidized, e.g., by an Oppenauer oxidation, to produce a 7,17α-dimethyl-17β-hydroxy-4,6-androstadien-3-one represented by Formula V. This compound is then selectively hydrogenated with hydrogen and a hydrogenation catalyst to produce a 7β,17α-dimethyltestosterone represented by Formula VI. Each of compounds V and VI can be oxidized, e.g., with N-bromoacetamide or chromic acid, to produce the corresponding compounds wherein R is keto.

The starting 3β,17β-dihydroxy-17α-methyl-5-androsten-7-ones 3,17-diacylates (III) are prepared by the oxidation of the corresponding 3β,17β-dihydroxy-17α-methyl-5-androstene 3,17-diacylates (II) according to the method of Marshall et al., J. Am. Chem. Soc., 79, 1308 (1957).

The 7,17α-dimethyl-4,6-androstadien-3-ones (V) of this invention have androgenic and anabolic activity of improved therapeutic ratio. They also possess central nervous system regulating and gonadotropin inhibiting activity of improved therapeutic ratio. The compound wherein R is β-hydroxy is particularly valuable as an anabolic agent with very little androgenic activity. The compounds of this invention can be prepared and administered in a wide variety of oral or parenteral dosage forms singly, or in admixture with other coacting compounds. They can be administered to the animal organism along with a liquid or solid pharmaceutical carrier in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups and elixirs.

The 7,17α-dimethyl-4,6-androstadien-3-ones (V) of this invention are also useful as intermediates in the production of 7,17α-dimethyltestosterones (VI), which compounds, described in Application 740,194, are pharmacologically active androgenic-anabolic compounds, and are prepared by hydrogenation of the Δ⁶-double bond with about a molar equivalent of hydrogen in the presence of a hydrogenation catalyst, e.g., palladium on charcoal, or with lithium and ammonia in tetrahydrofuran.

The intermediate 3β,7,17β-trihydroxy-7,17α-dimethyl-5-androstenes (IV) also possess pharmacological activity, including anabolic-androgenic, gonadotropin inhibiting, salt and water regulating and CNS modifying activity.

The novel 11β-hydroxy-17α-methyl-6-dehydrotestosterones, their 11α-isomers, 11-keto-17α-methyl-6-dehydrotestosterones and the corresponding 9α-halo compounds, especially the 9α-fluoro compounds, possess a high order or physiological activity. These novel compounds are orally active anabolic agents and have an improved ratio of oral anabolic to androgenic activity as well as gonadotropic inhibiting properties of improved therapeutic ratio and anti-hormone properties.

The novel 11β-hydroxy-17α-methyl-6-dehydrotestosterones, their 11α-isomers, 11-keto-17α-methyl-6-dehydrotestosterones, and the corresponding 9α-halo compounds are particularly useful in oral compositions. They may be administered to the animal organism orally as tablets, illustratively, using either polyethylene glycol 4000 or 6000 as a carrier or lactose and/or sucrose and a diluent. They may be administered orally in other conventional dosage forms, such as pills, capsules, solutions, syrups and elixirs.

According to the present invention, the novel 11β-hydroxy-17α-lower-alkyl-6-dehydrotestosterones (V) or their 11α-hydroxy isomers, and 11-keto-17α-lower-alkyl-6-dehydrotestosterones (V') can be prepared, respectively, from 17α-lower-alkyl-5-androstene-3β,11β,17β-triols (I') or their 11α-hydroxy isomers (Preparation 1) and from 11-keto-17α-methyltestosterone (U.S. Patent 2,678,933) (IA) or alternatively, 11-keto-17α-lower-alkyl-6-dehydrotestosterones (V') can be prepared from 11β-hydroxy-17α-lower-alkyl-6-dehydrotestosterones, (V) by oxidation. The compounds represented by Formulae V and V' of this invention can be readily converted to their 17-acylates and 11,17-diacylates by conventional esterification procedures. The preferred acylates and diacylates are those wherein the acyl radical is that of a hydrocarbon carboxylic acid of from 1 to 12 carbon atoms, inclusive. In the form of these acylates, the compounds possess the same properties as the free alcohol, often varying in degree and duration of activity.

In the conversions described hereinafter, 11β-hydroxy-17α-methyl-6-dehydrotestosterone (V) is produced by reacting 17α-methyl-5-androstene-3β,11β,17β-triol (I') with para quinone and aluminum tertiary butoxide; 11-keto-17α-methyl-6-dehydrotestosterone (V') is produced by reacting 11-keto-17α-methyltestosterone (IA) with chloranil; or alternatively 11-keto-17α-methyl-6-dehydrotestosterone (V') is produced by oxidizing 11β-hydroxy-17α-methyl-6-dehydrotestosterone (V) suspended in methylene chloride with a mixture of sodium dichromate and sulfuric acid while stirring, adding methanol, and extracting the converted 11-keto steroid. In further accordance with the present invention, the novel 9α-halo-11-oxygenated-17α-lower-alkyl-6-dehydrotestosterones, 9α-halo-11-keto-17α-lower-alkyl-6-dehydrotestosterones, and particularly 9α-fluoro-11β-hydroxy-17α-lower-alkyl-6-dehydrotestosterones (V) and 9α-fluoro-11-keto-17α-lower-alkyl-6-dehydrotestosterones (V') can be prepared, respectively, from 9α-fluoro-11β-hydroxy-17α-lower-alkyl-testosterones (IB) (Preparation 2) and from 9α-fluoro-11-keto-17α-lower-alkyl-testosterones (IC) (Preparation 3) or alternatively, 9α-fluoro-11-keto-17α-lower-alkyl-6-dehydrotestosterones (V') can be prepared from 9α-fluoro-11β-hydroxy-17α-lower-alkyl-6-dehydrotestosterones (V) by oxidation. The compounds represented by Formulae V and V' of this invention can be readily converted to their 17 acylates and 11,17 diacylates by conventional esterification procedures. The preferred acylates and diacylates are those wherein the acyl radical is that of a hydrocarbon carboxylic acid of from one to twelve carbon atoms, inclusive. In the form of these acylates, the compounds possess the same properties as the free alcohol, often varying in degree and duration of activity.

In the conversions described hereinafter, a 9α-halo-11-oxygenated-17α-lower-alkyl-6-dehydrotestosterone and particularly 9α-fluoro-11β-hydroxy-17α-methyl-6-dehydrotestosterone and 9α-fluoro-11-keto-17α-methyl-6-dehydrotestosterone, respectively, are produced by reacting 9α-fluoro-11β-hydroxy-17α-methyltestosterone and 9α-fluoro-11-keto-17α-methyltestosterone with chloranil. Alternatively, 9α-fluoro-11-keto-17α-methyl-6-dehydrotestosterone is produced by the sodium dichromate-sulfuric acid oxidation of 9α-fluoro-11β-hydroxy-17α-methyl-6-dehydrotestosterone.

Certain compounds of the instant invention, namely, 11β-hydroxy-17α-methyl-6-dehydrotestosterone, 11-keto-17α-methyl-6-dehydrotestosterones and the corresponding 9α-halo compounds are useful as starting materials for the preparation of other physiologically important compounds. For example, 9α-halo-11β-hydroxy-7,17α-dimethyltestosterone, 9α-halo-11-keto-7,17α-dimethyltestosterone, 11β-hydroxy-7,17α-dimethyltestosterone and 11-keto-7,17α-dimethyltestosterone, respectively, can be produced from 9α-halo-11β-hydroxy-17α-methyl-6-dehydrotestosterone, 9α-halo-11-keto-17α-methyl-6-dehydrotestosterone, 11β-hydroxy-17α-methyl-6-dehydrotestosterone, and 11-keto-17α-methyl-6-dehydrotestosterone, respectively, by reaction with the appropriate Grignard reagents. The compounds thus produced exhibit anabolic androgenic, anti-estrogenic, gonadotropin inhibiting, tumor (e.g., mammary) inhibiting progestational, growth promoting and central nervous system regulating activity and are of value in medical and veterinary practice. For instance, 7,17-dimethyl-11β-hydroxytestosterone, 7,17-dimethyl-11-ketotestosterone, 9α-fluoro-7,17-dimethyl-11β-hydroxytestosterone and 9α-fluoro-7,17-dimethyl-11-ketotestosterone can be prepared from the corresponding 6-dehydrotestosterones as shown in the following Examples A to D, below.

EXAMPLE A

7,17-Dimethyl-11β-Hydroxytestosterone

A solution was prepared by the addition of 100 milliliters of 3 M methyl magnesium bromide in ether to a mixture of 1.6 grams of cuprous chloride in 240 milliliters of purified tetrahydrofuran. To this solution was added a solution of 8.0 grams of 6-dehydro-11β-hydroxy-17-methyltestosterone (synthesized as described in Example 11, below) and 0.8 gram of partially dissolved cuprous chloride in 300 milliliters of tetrahydrofuran, under nitrogen and with stirring and cooling in an ice-salt bath. After fifteen minutes, the reaction mixture was poured into a mixture of dilute hydrochloric acid, ice and ether saturated with salt. The ether phase was separated, washed with brine followed by dilute sodium hydroxide saturated with salt and then again with brine, and then dried over magnesium sulfate. The dried solution was filtered and concentrated to dryness. The residue was dissolved in methylene chloride which was then poured onto a 250 gram magnesium silicate (Florisil) chromatographic column. The column was eluted with four to ten percent acetone in methylene chloride which was then concentrated to produce a crystalline product. Purification of the crude product yielded light colored crystals of 7,17-dimethyl-11β-hydroxytestosterone.

EXAMPLE B

7,17-Dimethyl-11-Ketotestosterone

Following the procedure described in Example A, but substituting as starting steroid 6-dehydro-11-keto-17-methyltestosterone (synthesized as described in Example 12, below) is productive of 7,17-dimethyl-11-ketotestosterone.

EXAMPLE C

9α-Fluoro-7,17-Dimethyl-11β-Hydroxytestosterone

Following the procedure described in Example A, but substituting as starting steroid 9α-fluoro-11β-hydroxy-17α-methyl-6-dehydrotestosterone (synthesized as described in Example 14 below) is production of 9α-fluoro-7,17-dimethyl-11β-hydroxytestosterone.

EXAMPLE D

9α-Fluoro-7,17-Dimethyl-11-Ketotestosterone

Following the procedure described in Example A, but substituting as starting steroid 9α-fluoro-11-keto-17α-methyl-6-dehydrotestosterone (synthesized as described in Example 13 below) is productive of 9α-fluoro-7,17-dimethyl-11-ketotestosterone.

The following examples and preparations are illustrative of the products and process of this invention.

EXAMPLE 1

3β,17β-Dihydroxy-17α-Methyl-5-Androstene 3-Acetate, 17-Trifluoroacetate

A solution of 30 g. of 3β,17β-dihydroxy-17α-methyl-5-androstene in 60 ml. of pyridine and 50 ml. of acetic anhydride was maintained at room temperature for 18 hours. The solution was diluted with water followed by dilute hydrochloric acid and then extracted with ether. The ether extract was washed with dilute hydrochloric acid, water, dilute sodium hydroxide and again with water and then dried. The solvent was removed leaving a residue of 3β,17β-dihydroxy-17α-methyl-5-androstene 3-acetate which was dissolved in 200 ml. of pyridine. To the solution was added 45 ml. of trifluoroacetic anhydride with swirling and cooling in an ice bath. The solution was maintained at room temperature for 3.25 hours and then extracted in the same manner as described above. The final ether solution was slurried with 25 g. of magnesium silicate (Florisil) and filtered. The solvent was removed from the filtrate and the residue slurried with 50 ml. of methanol. The methanol was removed and the crystalline residue rewashed with methanol until 37 g. of white crystalline 3β,17β-dihydroxy-17α-methyl-5-androstene 3-acetate, 17-trifluoroacetate was obtained melting at 116–118° C., having an $[\alpha]_D$ of $-63°$ (CHCl$_3$) and the analysis below.

Calculated for $C_{24}H_{33}F_3O_4$: C, 65.14; H, 7.52. Found: C, 64.81; H, 7.96.

EXAMPLE 2

3β,11β,17β-Trihydroxy-17α-Methyl-5-Androstene 3-Acetate, 11β,17β-di(Trifluoroacetate)

Following the procedure of Example 1 exactly, but substituting as starting steroid 3β,11β,17β-trihydroxy-17α-methyl-5-androstene and employing twice the amount of trifluoroacetic anhydride, there is thus produced 3β,11β,17β-trihydroxy-17α-methyl-5-androstene 3-acetate, 11β,17β-di(trifluoroacetate).

Similarly, other mixed diesters of 3β,17β-dihydroxy-17α-methyl-5-androstene and mixed triesters of 3β,11β,17β-trihydroxy-17α-methyl-5-androstene are prepared by the selective esterification of the 3-hydroxy group according to methods known in the art, e.g., by reaction with an acid anhydride, acid chloride or bromide, acid in the presence of an esterification catalyst or ester under ester exchange conditions, followed by esterification of the remaining hydroxyl groups with an esterification reagent capable of esterifying difficultly esterifiable hydroxyl groups, e.g., formic acid, trifluoroacetyl halide or anhydride. Alternatively, all of the hydroxyl groups can be esterified simultaneously by reaction of the starting unesterified compound with one of the latter esterifying reagents. Examples of 3β,17β-dihydroxy - 17α - methyl-5-androstene 3,17-diacylates and 3β,11β,17β-trihydroxy-17α-methyl-5-androstene 3,11,17-triacylates thus prepared include those wherein the acyl radical of the 3-ester group is that of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylproprionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic or a heterosubstituted acid, e.g., cyanoacetic, chloroacetic, fluoroacetic, trichloroacetic, trifluoroacetic, etc., and the remaining acyl radicals are those of, e.g., formic or trifluoroacetic acid.

EXAMPLE 3

3β,17β-Dihydroxy-17α-Methyl-5-Androsten-7-One 3-Acetate, 17-Trifluoroacetate A solution of 25 g. of 3β,17β-dihydroxy-17α-methyl-5-androstene 3-acetate, 17-trifluoroacetate in 172 ml. of carbon tetrachloride, 50 ml. of acetic acid and 13 ml. of acetic anhydride was warmed to 55° C. and to the stirred solution was added a solution containing the equivalent of 34 g. of CrO$_3$ as tertiary butyl chromate in 282 ml. of carbon tetrachloride, 50 ml. of acetic acid and 13 ml. of acetic anhydride. The addition required 45 minutes, after which the temperature was maintained at 60–65° C. for 20 hours. The reaction mixture was then cooled to 20° C., and one liter of 10% oxalic acid was slowly added with stirring and cooling so as to maintain the temperature below 25° C. The carbon tetrachloride and emulsion phases were separated from the aqueous phase and washed with brine, water, dilute sodium hydroxide and twice more with water. The aqueous phases were back extracted with methylene chloride. The combined extracts were dried and the solvent removed. The residue was slurried with methanol, collected on a filter, washed with water and dried to give 3β,17β-dihydroxy-17α-methyl-5-androsten-7-one 3-acetate, 17-trifluoroacetate melting at 139–142° C., having an $[\alpha]_D$ of $-108°$ (CHCl$_3$), and a $$\lambda_{max.}^{alc.}\ 235\ m\mu,\ a_M.=13,150$$

EXAMPLE 4

3β,11β,17β-Trihydroxy-17α-Methyl-5-Androsten-7-One 3-Acetate, 11,17-Di(Trifluoroacetate)

Following the procedure of Example 3 exactly, but substituting 3β,11β,17β-trihydroxy - 17α - methyl-5-androstene 3-acetate, 11,17-di(trifluoroacetate) as the starting material, there is thus produced 3β,11β,17β-trihydroxy-17α-methyl-5-androsten-7-one 3-acetate, 11,17-di(trifluoroacetate).

Similarly, other mixed diesters of 3β,17β-dihydroxy-17α-methyl-5-androstene and mixed triesters of 3β,11β,17β-trihydroxy-17α-methyl-5-androstene, e.g., wherein the acyl radical of the 3-ester group is an acid named in the paragraph following Example 2 and the remaining acyl radicals are that of, e.g., formic or trifluoroacetic acid, are oxidized to the corresponding esters of 3β,17β-dihydroxy-17α-methyl-5-androsten-7-one and 3β,11β,17β-trihydroxy-17α-methyl-5-androsten-7-one, respectively.

EXAMPLE 5

3β,7,17β-Trihydroxy-7,17α-Dimethyl-5-Androstene and 3-Acetate

To a solution of 10 g. of 3β,17β-dihydroxy-17α-methyl-5-androsten-7-one 3-acetate, 17-trifluoroacetate in 500 ml. of ether was added, over a 10-minute period with cooling, 200 ml. of ether containing about a 6 molar excess of methyl lithium over the amount theoretically required to react with all the reactive groups. After 2 hours, 50 ml. of methanol was added and the solution was washed three times with water and then concentrated to about 50 ml. 25 ml. of water was added to the concentrate and the precipitate was collected, washed with ether and dried to give 6.3 g. of crystalline 3β,7,17β-trihydroxy-7,17α-dimethyl-5-androstene which resisted purification.

The 6.3 g. of product was acetylated with acetic anhydride in pyridine in the manner described in Example 1, the steroid isolated and then chromatographed over a column of magnesium silicate (Florisil) which was developed with hexanes (Skellysolve B) containing increasing proportions of acetone. The main eluate was recrystallized from a mixture of acetone and hexanes to give 3β,7,17β-trihydroxy-7,17α-dimethyl-5-androstene 3-acetate melting at 164–173° C., having an $[\alpha]_D$ of $-83°$ (CHCl$_3$) and the analysis below.

Calculated for $C_{23}H_{36}O_4$: C, 73.36; H, 9.64. Found: C, 73.55; H, 9.76.

EXAMPLE 6

3β,7,11β,17β-Tetrahydroxy-7,17α-Dimethyl-5-Androstene and 3-Acetate

Following the procedure of Example 5 exactly, but substituting 3β,11β,17β - trihydroxy-17α-methyl-5-androsten-7-one 3-acetate, 11,17-di(trifluoroacetate) as starting compound, there is thus produced 3β,7,11β,17β-tetrahydroxy-7,17α-dimethyl-5-androstene which is converted to its 3-acetate in the same manner.

Similarly, other mixed diesters of 3β,17β-dihydroxy-17α-methyl-5-androsten-7-one and 3β,11β,17β-trihydroxy-17α-methyl-5-androsten-7-one, e.g., wherein the acyl radical of the 3-ester group is an acid named in the paragraph following Example 2 and the remaining acyl radicals are that of, e.g., formic or trifluoroacetic acid, are converted with methyl lithium to 3β,7,17β-trihydroxy-7,17α-dimethyl-5-androstene and 3β,7,11β,17β-tetrahydroxy-7,17α-dimethyl-5-androstene, respectively. Methyl magnesium bromide can be substituted for the methyl lithium.

EXAMPLE 7

7,17α-Dimethyl-17β-Hydroxy-4,6-Androstadien-3-One

A solution of 5 g. of 3β,7,17α-trihydroxy-7,17α-dimethyl-5-androstene in 50 ml. of cyclohexanone and 300 ml. of toluene was boiled to remove all traces of water and then 5 g. of aluminum tertiary butoxide was added. The solution was refluxed for three hours and then concentrated to 175 ml. The cooled concentrate was washed with dilute sodium hydroxide and water, dried and filtered. The filtrate was chromatographed over a column of magnesium silicate (Florisil). The column was developed with hexanes (Skellysolve B) containing increasing proportions of acetone. 2.7 g. of 7,17α-dimethyl-17β-hydroxy-4,6-androstadien-3-one was eluted with hexanes plus 8% acetone and crystallized by triturating with a mixture of ether and water. Recrystallization from aqueous ethyl alcohol gave crystals melting at 91–102° C., having an $[\alpha]_D$ of +196° (CHCl$_3$), a $$\gamma_{max.}^{alc.} 296 \text{ m}\mu, a_M = 27,700$$

and the analysis below.

Calculated for $C_{21}H_{32}O_2$: C, 80.21; H, 9.62. Found: C, 79.71; H, 9.96.

EXAMPLE 8

7,17α-Dimethyl-11β,17β-Dihydroxy-4,6-Androstadien-3-One

Following the procedure of Example 7 exactly, but substituting 3β,7,11β,17β - tetrahydroxy-7,17α-dimethyl-5-androstene as the starting compound, there is thus produced 7,17α - dimethyl - 11β,17β - dihydroxy - 4,6 - androstadien-3-one. This compound is eluted from a magnesium silicate column with hexanes containing more acetone than that required in Example 7.

EXAMPLE 9

7,17α-Dimethyl-17β-Hydroxy-4,6-Androstadiene-3,11-Dione 1.0 g. of 7,17α-dimethyl-11β,17β-dihydroxy-4,6-androstadien-3-one dissolved in 10 ml. of glacial acetic acid was added to a solution of 1.0 g. of sodium dichromate dihydrate in 10 ml. of glacial acetic acid with stirring and cooling in a cold water bath. After the addition was complete, the water bath was removed and the reaction mixture was stirred at room temperature for 20 hours. The product was flooded out with water, collected on a filter, washed well with water and dried. The thus-obtained 7,17α-dimethyl-17β-hydroxy-4,6-androstadiene-3,11-dione was purified by crystallization from a mixture of acetone and hexanes (Skellysolve B).

EXAMPLE 10

7β,17α-Dimethyl-17β-Hydroxy-4-androsten-3-One

To about 40 ml. of ammonia cooled in a dry ice-acetone bath was added about 4 mg. of lithium followed by 0.3 g. of 7,17α-dimethyl-17β-hydroxy-4,6-androstadien-3-one in 10 ml. of tetrahydrofuran. An additional 32 mg. of lithium was added in small pieces over a period of about 15 minutes. After the ammonia was evaporated, the solution was further concentrated under vacuum. The concentrate was diluted with water and the product extracted with ether. The thus-obtained 7β,17α-dimethyl-17β-hydroxy-4-androsten-3-one was chromatographed over a 75 g. column of magnesium silicate (Florisil). The 7β,17α-dimethyl-17β-hydroxy-4-androsten-3-one was eluted with hexanes (Skellysolve B) plus 6% acetone and, after being recrystallized from acetone and hexanes, melted at 127–129° C., had an $[\alpha]_D$ of +57° (CHCl$_3$), a $$\lambda_{max.}^{alc.} \text{ of } 243 \text{ m}\mu, a_M = 16,650$$

and the analysis below.

Calculated for $C_{21}H_{32}O_2$: C, 79.69; H, 10.19. Found: C, 79.63; H, 9.89.

Following the above procedure, but employing the same amount of 7,17α-dimethyl-11β,17β-dihydroxy-4,6-androstadien-3-one as the starting compound, there is thus produced 7β,17α-dimethyl-11β,17β-dihydroxy-4-androsten-3-one. Similarly, 7,17α-dimethyl-17α-hydroxy-4,6-androstadiene-3,11-dione is converted to 7β,17α-dimethyl-17α-hydroxy-4-androstene-3,11-dione.

Hydrogenation of 7,17α-dimethyl-17β-hydroxy-4,6-androstadien-3-one using prereduced 5% palladium on charcoal in dimethylformamide until 1.2 moles of hydrogen is consumed followed by purification by chromatography as in Example 10 gives 7β,17α-dimethyl-17β-hydroxy-4-androsten-3-one.

PREPARATION 1

17α-Methyl-5-Androstene-3β,11β,17β-Triol

A solution of five grams of 11β-hydroxy-17α-methyltestosterone (U.S. Patent 2,735,854), 25 milliliters of acetic anhydride, 100 milligrams of para toluenesulfonic acid, and 100 milliliters of toluene was heated in a nitrogen atmosphere at reflux for a period of four and one-half hours. The residue was dissolved in 100 milliliters of 95 percent alcohol and three milliliters of ten percent sodium hydroxide and cooled to zero degrees centigrade.

A solution of five grams of sodium borohydride and 100 milliliters of seventy percent alcohol was added to the solution with stirring and cooling. After one hour, 2.5 grams of sodium borohydride in fifty milliliters of seventy percent alcohol was added. The solution was stored three days at five degrees centigrade, then fifteen milliliters of ten percent sodium hydroxide solution was added and the solution heated to nearly boiling. The alcohol was distilled off under vacuum. Ice and three normal hydrochloric acid was added to the concentrate with stirring. The product precipitated and was collected. It was washed with water, dilute hydrochloric acid then water and dried. The yield was 5.7 grams. This material was dissolved in fifty milliliters of tetrahydrofuran and 1.5 grams of lithium aluminum hydride was added slowly with stirring. After about three minutes the reaction mixture set to a hard jell. Fifteen milliliters of ether was added and the mixture stirred for one hour. Ethyl acetate and water were added. The aqueous phase was separated, extracted with ether and then with methylene chloride. The nonaqueous phase and the extracts were combined, dried over magnesium sulfate and filtered. The filtrate, on standing overnight, deposited 1.6 grams of crystals having a melting point of 223 to 230 degrees centigrade. The liquor was concentrated to dryness and triturated with methylene chloride to give an additional 1.3 grams with a melting point of 203 to 210 degrees centigrade. The two crops were combined and crystallized from fifteen milliliters of alcohol, containing 0.5 milliliter of water. The yield was 1.7 grams, and the melting point 227 to 230 degrees centigrade. The compound (17α-methyl-5-androstene-3β,11β,17β-triol) was recrystallized from ethyl acetate, and yielded 1.2 grams with a melting point of 230 to 235 degrees centigrade and having a rotation of $[\alpha]_D$ minus 68 degrees (dioxane).

Anal.—Calculated for $C_{20}H_{32}O_3$: C, 74.95; H, 10.07. Found: C, 74.53; H, 10.16.

In the same manner as described in Preparation 1, but employing as starting steroid an 11β-hydroxy-17α-lower-alkyl (ethyl, propyl, isopropyl, butyl, sec.-butyl, amyl or hexyl)-testosterone there is thus produced the corresponding 17α-lower-alkyl (ethyl, propyl, isopropyl, butyl, sec.-butyl, amyl or hexyl)-5-androstene-3β,11β,17β-triol.

In the same manner as described in Preparation 1, except that 11α-hydroxy-17α-methyltestosterone is the starting steroid compound employed, there is thus produced the corresponding 17α-methyl-5-androstane-3β,11α,17β-triol.

PREPARATION 1A

9(11)-Dehydro-17α-Methyltestosterone

A warm solution of one gram of 11α-hydroxy-17-methyltestosterone (Example 1, U.S. Patent 2,660,586) in two milliliters of dry pyridine was mixed with one gram of para-toluenesulfonyl chloride. The mixture was maintained at room temperature for eighteen hours and then poured into 25 milliliters of water. The mixture was stirred until the precipitated oil solidified. The solid was filtered, washed with water and dried to give 1.41 grams of 11α-p-toluenesulfonyloxy-17α-methyl-17β-hydroxy-4-androsten-3-one which melted at 144 to 148 degrees centigrade with decomposition and, after crystallization from a mixture of methylene chloride and hexane hydrocarbons, melted at 141 to 144 degrees centigrade with decomposition and had an $[\alpha]_D$ of plus 41 degrees in chloroform and the analysis below:

Anal.—Calculated for $C_{27}H_{36}O_5S$: C, 68.61; H, 7.68; S, 6.78. Found: C, 68.86; H, 7.86; S, 6.89.

A mixture of one gram of the thus-produced 11α-p-toluenesulfonyloxy-17α-methyl - 17β-hydroxy - 4 - androsten-3-one, 0.2 gram of sodium formate, 0.57 milliliter of water and fourteen milliliters of absolute ethanol was heated at its refluxing temperature for a period of nineteen hours. The solution was cooled and then poured onto fifty grams of a mixture of ice and water with stirring. The resulting precipitate was filtered and dried to give 0.59 gram of 9(11)-dehydro-17α-methyltestosterone which melted at 156 to 160 degrees centigrade and, after crystallization from a mixture of methylene chloride and hexane hydrocarbons, melted at 167 to 170 degrees centigrade and had an $[\alpha]_D$ of plus 57 degrees in chloroform and the analysis below:

Anal.—Calculated for $C_{20}H_{28}O_2$: C, 79.96; H, 9.39. Found: C, 79.59; H, 9.08.

PREPARATION 1B

9α-Bromo-11β-Hydroxy-17α-Methyltestosterone

To a solution of one gram of 9(11)-dehydro-17α-methyltestosterone (Preparation 1A) in fifty milliliters of acetone was added dropwise, with stirring, at fifteen degrees centigrade, one gram of N-bromoacetamide dissolved in 25 milliliters of water. A solution of twenty milliliters of 0.8 normal perchloric acid was then slowly added at the same temperature. After twenty minutes, there was added a sufficient amount of a saturated aqueous solution of sodium sulfite to discharge the yellow color of the solution. The resulting mixture was then diluted with 100 milliliters of water thereby precipitating one gram of 9α-bromo-11β-hydroxy-17α-methyltestosterone as needles melting at 153 to 155 degrees centigrade.

PREPARATION 1C

9β,11β-Epoxy-17α-Methyltestosterone

A suspension of one gram of 9α-bromo-11β-hydroxy-17α-methyltestosterone (Preparation 1B) in thirty milliliters of methanol, was titrated with one molar equivalent of 0.1 normal aqueous sodium hydroxide. The resulting mixture was diluted with fifty milliliters of water and then chilled to about zero degrees centigrade thereby precipitating 0.64 gram of 9β,11β-epoxy-17α-methyltestosterone melting at 170 to 176 degrees centigrade which, after crystallization from dilute methanol, melted at 165 to 172 degrees centigrade (with sublimation) and had an $[\alpha]_D$ of minus forty degrees in chloroform and the analysis below:

Anal.—Calculated for $C_{20}H_{28}O_3$: C, 75.92; H, 8.92. Found: C, 75.60; H, 8.96.

PREPARATION 2

9α-Fluoro-11β-Hydroxy-17α-Methyltestosterone

Two milliliters of 48 percent aqueous hydrofluoric acid was added to a solution of 0.5 gram of 9β,11β-epoxy-17α-methyltestosterone (Preparation 1C) in ten milliliters of methylene chloride. The mixture was stirred at room temperature for five hours and then cautiously poured, with stirring, into six grams of sodium bicarbonate dissolved in ice and water. The precipitated steroid was extracted with methylene chloride, the extract washed with water and then dried. The solvent was distilled from the dried solution and the residue crystallized from methylene chloride to give 148 milligrams of 9α-fluoro-11β-hydroxy-17α-methyltestosterone. Its melting point was 265 degrees centigrade (with decomposition) and it had a rotation $[\alpha]_D$ of plus 110 degrees (chloroform) and the analysis below:

Anal.—Calculated for $C_{20}H_{29}O_3F$: C, 71.40; H, 8.69; F, 5.65. Found: C, 71.71; H, 8.66, F. 5.75.

Similarly, 9α-fluoro-11β-hydroxy-17α-ethyltestosterone is prepared by substituting 9β,11β-epoxy-17α-ethyltestosterone as the starting steroid (prepared by substituting 11α-hydroxy-17α-ethyltestosterone for the 11α-hydroxy-17α-methyltestosterone in Preparation 1A and carrying out the succeeding steps of Preparations 1B and 1C).

In the same manner as described in Preparation 2, reacting 9,11β-epoxy-17α-methyltestosterone with hydrochloric acid or hydrobromic acid is productive of 9α-chloro-11β-hydroxy-17α-methyltestosterone or 9α-bromo-11β - hydroxy - 17α - methyltestosterone. Similarly, 9α-chloro-11β-hydroxy-17α-ethyltestosterone or 9α-bromo-11β-hydroxy-17α-ethyltestosterone is prepared by substituting 9β,11β-epoxy-17α-ethyltestosterone as the starting steroid.

PREPARATION 3

9α-Fluoro-11-Keto-17α-Methyltestosterone

A solution of 0.25 gram of chromium trioxide and one milliliter of water in twenty milliliters of acetic acid was added to a solution of 0.457 gram of 9α-fluoro-11β-hydroxy-17α-methyltestosterone (Preparation 2) in twenty milliliters of glacial acetic acid. The mixture was maintained at room temperature for 4.5 hours and then mixed with five milliliters of methanol. The solvent was removed by distillation at reduced pressure and the almost dry residue mixed with twenty milliliters of water. The precipitate was filtered, washed with water and then dried to give 0.362 gram of 9α-fluoro-11-keto-17α-methyltestosterone melting at 208 to 212 degrees centigrade and, after crystallization from dilute methanol and then from a mixture of acetone and hexane hydrocarbons, melting at 213 to 220 degrees centigrade, having a rotation of $[\alpha]_D$ plus 144 degrees (chloroform) and the analysis below:

Anal.—Calculated for $C_{20}H_{27}O_3F$: C, 71.83; H, 8.14; F, 5.86. Found: C, 72.13; H, 8.30; F, 5.83.

Similarly, 9α-fluoro-11-keto-17α-ethyltestosterone is prepared by substituting 9α-fluoro-11β-hydroxy-17α-ethyltestosterone as the starting steroid in Preparation 3.

In the same manner as described in Preparation 3, reacting 9α-chloro-11β-hydroxy-17-methyltestosterone or 9α-bromo-11β-hydroxy-17α-methyltestosterone with chromium trioxide in acetic acid is productive of 9α-chloro-11-keto-17-methyltestosterone or 9α-bromo - 11 - keto - 17α-methyltestosterone.

Similarly, 9α-chloro-11-keto-17α-ethyltestosterone or 9α-bromo-11-keto-17α-ethyltestosterone is prepared by substituting 9α-chloro-11β-hydroxy-17α-ethyltestosterone or 9α-bromo-11β-hydroxy-17α-ethyltestosterone as the starting steroids as in Preparation 3.

EXAMPLE 11

*11β,17β-Dihydroxy-17α-Methyl-4,6-Androstadien-3-One (11β-Hydroxy-17α-Methyl-6-Dehydrotestosterone)*

To a solution of two grams of 17α-methyl-5-androstene-3β,11β,17β-triol and twelve grams of para-quinone in 150 milliliters of toluene (dried by distilling off thirty milliliters) was added 2.0 grams of aluminum tertiary-butoxide. After refluxing for fifty minutes the solution was cooled and washed with dilute sodium hydroxide and water. The aqueous phases were extracted with methylene chloride. The nonaqueous solutions were combined and the methylene chloride removed by distillation. The toluene solution was poured onto a 100 gram Florisil (synthetic magnesium silicate) column packed wet with Skellysolve B (hexanes) and eluted with increasing amounts of acetone in Skellysolve B. The fraction eluted with seventeen to twenty percent acetone yielded 0.6 gram of product, 11β,17β-dihydroxy-17α-methyl-4,6-androstadien-3-one which on recrystallization from ethyl acetate-acetone gave 0.4 gram of purified product of melting point 246 to 254 degrees centigrade and having a rotation of $[\alpha]_D$ plus 150 degrees (chloroform) and ultraviolet absorption of $$\lambda_{max}^{alc.}\ 284.5\ m\mu,\ a_M\ 24,825$$

*Anal.*—Calculated for $C_{20}H_{28}O_3$: C, 75.91; H, 8.92. Found: C, 75.97; H, 9.13.

Following the procedure described in Example 11, but substituting as starting steroid a 17α-lower-alkyl (ethyl, propyl, isopropyl, butyl, sec.-butyl, amyl or hexyl)-5-androstene-3β,11β,17β-triol (synthesized as described in Preparation 1) there is thus produced the corresponding 11β-hydroxy-17α-lower alkyl (ethyl, propyl, isopropyl, butyl, sec.-butyl, amyl or hexyl)-6-dehydrotestosterone.

EXAMPLE 11A

*11β,17β-Dihydroxy-17α-Methyl-4,6-Androstadien-3-One (11β-Hydroxy-17α-Methyl-6-Dehydrotestosterone)*

Fifteen grams of chloranil (2, 3, 5, 6-tetrachloro-1,4-benzoquinone) was added to a solution of ten grams of 11β-hydroxy-17α-methyltestosterone (U.S. Patent 2,735,854) in 900 milliliters of boiling tertiary-butyl alcohol. The solution was heated under reflux for two to three hours and then cooled nearly to room temperature and the chloranil that precipitated was removed by filtration. The filtrate was concentrated to dryness, and the residue was taken up in about equal portions of tetrahydrofuran and ethyl acetate and washed once with dilute sodium hydroxide saturated with sodium chloride and twice with saturated sodium chloride solution. The washed solution was dried and the solvent removed. The residue was recrystallized from acetone to give 11β,17β-dihydroxy-17α-methyl-4,6-androstadien-3-one and had the same physical constants as when synthesized by the method described in Example 11.

EXAMPLE 12

*11-Keto-17β-Hydroxy-17α-Methyl-4,6-Androstadien-3-One (11-Keto-17α-Methyl-6-Dehydrotestosterone)*

12.5 grams of 11β,17β-dihydroxy-17α-methyl-4,6-androstadien-3-one (11β-hydroxy-17α-methyl-6-dehydrotestosterone) was suspended in 250 milliliters of methylene chloride in a 500 milliliter round bottom flask equipped with an efficient stirrer and an inside thermometer. 7.5 grams of sodium dichromate was dissolved in 62.5 milliliters of water and ten milliliters of sulfuric acid was added to it cautiously with cooling and swirling. The sodium dichromate-sulfuric acid mixture was gradually added to the steroid suspended in the methylene chloride. After six hours of stirring, seven milliliters of methanol was cautiously added to the reaction mixture and stirring continued overnight. The stirring was discontinued and the layers were separated. The dark blue-green aqueous layer was diluted with 100 milliliters of water and extracted twice with twenty milliliter portions of methylene chloride. The methylene chloride extracts were combined with the original methylene chloride phase and the whole was washed successively with fifty milliliters of water, fifty milliliters of aqueous ten percent potassium bicarbonate, and fifty milliliters of water. The methylene chloride solution was dried by agitating with magnesium sulfate for several minutes and the drying agent was removed by filtration. The dried solution was concentrated at atmospheric pressure to approximately seventy milliliters and was then diluted with seventy milliliters of methanol and further concentrated to approximately fifty milliliters, at which time crystallization began spontaneously. Fifty milliliters of water was added and the mixture was allowed to cool to room temperature and then chilled overnight. The solids were removed by filtration and washed with cold fifty percent aqueous methanol and then water. The solid material was drained thoroughly and dried overnight at eighty degrees centigrade under reduced pressure. The yield was 11.3 grams of 11-keto-17β-hydroxy-17α-methyl-4,6-androstadien-3-one (11-keto-17α-methyl-6-dehydrotestosterone).

Following the procedure described in Example 12, but substituting as starting steroid a different 11β-hydroxy-17α-lower-alkyl (ethyl, propyl, isopropyl, butyl, sec.-butyl, amyl or hexyl)-6-dehydrotestosterone, there is thus-produced the corresponding 11-keto-17α-lower alkyl (ethyl, propyl, isopropyl, butyl, sec.-butyl, amyl or hexyl)-6-dehydrotestosterone.

EXAMPLE 13

*9α - Fluoro - 11 - Keto - 17β - Hydroxy - 17α - Methyl - 4,6 - Androstadien - 3 - one (9α - Fluoro - 11 - Keto - 17α-Methyl-6-Dehydrotestosterone)*

Fifteen grams of chloranil (2, 3, 5, 6-tetrachloro-1,4-benzoquinone) was added to a solution of ten grams of 9α-fluoro-11-keto-17α-methyltestosterone in 900 milliliters of boiling tertiary butyl alcohol. 9α-fluoro-11-keto-17α-methyltestosterone is made following the procedure described in Preparation 3, above. The solution was heated under reflux for two hours and twenty minutes. The solution was cooled nearly to room temperature and the chloranil that was precipitated was removed by filtration. The filtrate was concentrated to dryness and the residue was taken up in about equal portions of tetrahydrofuran and ethyl acetate. It was washed once with dilute sodium hydroxide saturated with sodium chloride, and twice with saturated sodium chloride solution. The washed solution was dried and the solvent removed. The resulting residue was recrystallized from acetone to yield 9α - fluoro - 11 - keto - 17α - methyl - 6 - dehydrotestosterone, a light colored crystalline solid.

Following the procedure described in Example 13, but substituting as starting steroid a different 9α-fluoro-11-keto-17α-lower-alkyl (ethyl, propyl, isopropyl, butyl, sec.-butyl, amyl or hexyl)-testosterone, there is thus produced the corresponding 9α - fluoro - 11 - keto - 17α-lower-alkyl (ethyl, propyl, isopropyl, butyl, sec.-butyl, amyl or hexyl)-6-dehydrotestosterone.

Following the procedure described in Example 13, but substituting as starting steroid a different 9α-chloro-11- keto-17α-lower-alkyltestosterone or 9α-bromo-11-keto-17α-lower-alkyltestosterone, there is thus produced the corresponding 9α-chloro-11-keto-17α-lower-alkyl-6-dehydrotestosterone or 9α-bromo-11-keto-17α-lower-alkyl-6-dehydrotestosterone.

EXAMPLE 14

*9α - Fluoro - 11β,17β - Dihydroxy - 17α - Methyl - 4,6-Androstadien - 3 - One (9α - Fluoro - 11β - Hydroxy - 17α-Methyl-6-Dehydrotestosterone)*

Fifteen grams of chloranil was added to a solution of ten grams of 9α-fluoro-11β-hydroxy-17α-methyltestosterone in 900 milliliters of boiling tertiary-butyl alcohol. The solution was heated under reflux for two hours and twenty minutes and was then cooled nearly to room temperature and the chloranil that precipitated was removed by filtration. The filtrate was concentrated to dryness, and the residue was taken up in about equal portions of tetrahydrofuran and ethyl acetate and washed once with dilute sodium hydroxide saturated with sodium chloride and twice with saturated sodium chloride solution. The washed solution was dried and the solvent removed. The residue was recrystallized from acetone to give 9α-fluoro-11β-hydroxy-17α-methyl-6-dehydrotestosterone of melting point 272 to 272.5 degrees centigrade with decomposition, and having an ultraviolet absorption of $$\lambda_{max}^{alc.} \ 282 \ m\mu, \ a_M 25,825$$

and [α]$_D$ plus 62 degrees (95 percent ethanol).

*Anal.*—Calculated for $C_{20}H_{27}FO_3$: C, 71.82; H, 8.14; F, 5.68. Found: C, 71.95; H, 8.55; F, 5.60.

Following the procedure described in Example 14, but substituting as starting steroid a different 9α-fluoro-11β-hydroxy-17α-lower-alkyl (ethyl, propyl, isopropyl, butyl, sec.-butyl, amyl or hexyl)-testosterone, there is thus-produced the corresponding 9α-fluoro-11β-hydroxy-17α-lower-alkyl (such as ethyl, propyl, isopropyl, butyl, sec.-butyl, amyl or hexyl)-6-dehydrotoestosterone.

EXAMPLE 15

*9α - Fluoro - 11 - Keto - 17α - Methyl - 4,6 - Androstadien - 3 - One (9α - Fluoro - 11 - Keto - 17α - Methyl - 6-Dehydrotestosterone)*

In the same manner as Example 12, except substituting 9α-fluoro-11β,17β-dihydroxy-17α-methyl - 4,6 - androstadien-3-one (9α-fluoro-11β-hydroxy-17α-methyl-6-dehydrotestosterone) as the starting material, 9α-fluoro-11-keto-17α-methyl-androsta-4,6-dien-3-one (9α-fluoro - 11 - keto-17α-methyl-6-dehydrotestosteronee a light colored crystalline solid is produced.

Following the procedure described in Example 12, but substituting as starting steroid a different 9α-fluoro-11β-hydroxy-17α-lower-alkyl (ethyl, propyl, isopropyl, butyl, sec.-butyl, amyl or hexyl)-6-dehydrotestosterone, there is thus produced the corresponding 9α-fluoro-11-keto-17α-lower-alkyl (ethyl, propyl, isopropyl, butyl, sec.-butyl, amyl or hexyl)-6-dehydrotestosterone.

We claim:
1. 11β - hydroxy - 17α - lower - alkyl - 6 - dehydrotestosterone of the following formula:

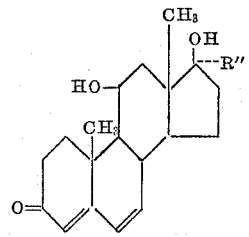

wherein R″ is a lower-alkyl radical.

2. 11β - hydroxy - 17α - lower - alkyl - 6 - dehydrotestosterone, wherein the lower-alkyl radical contains from one to six carbon atoms, inclusive.

3. 11β - hydroxy - 17α - methyl - 6 - dehydrotestosterone.

References Cited in the file of this patent
UNITED STATES PATENTS

| | | |
|---|---|---|
| 2,739,974 | Colton | Mar. 27, 1956 |
| 2,836,607 | Angello et al. | May 27, 1958 |
| 2,899,447 | Gould et al. | Aug. 11, 1959 |

OTHER REFERENCES

Butenandt et al.: Chem. Ber., vol. 71 (June 8, 1938), pp. 1316–1322.
Robinson et al.: J.A.C.S. 81, 408–410, Jan. 20, 1959.